Figure 1:
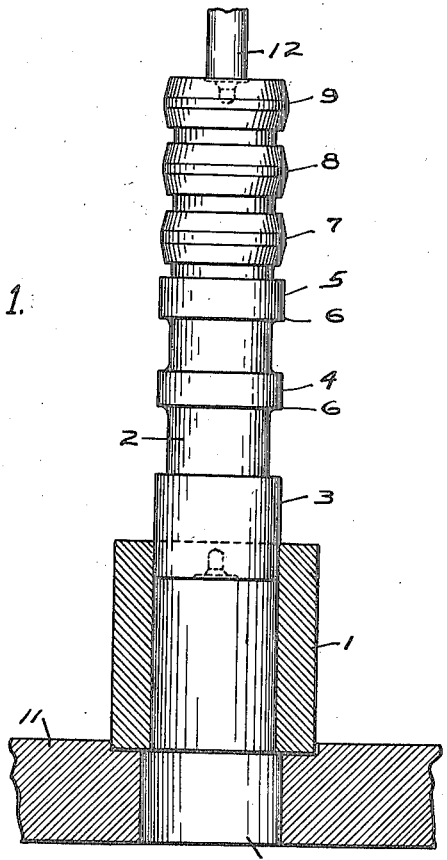

W. H. BUNTING.
BEARING.
APPLICATION FILED FEB. 15, 1915.

1,158,369.

Patented Oct. 26, 1915.
4 SHEETS—SHEET 1.

WITNESSES:-
R. G. Allen.
F. E. Aul.

INVENTOR.
William H. Bunting
by
Owen, Owen & Crampton.

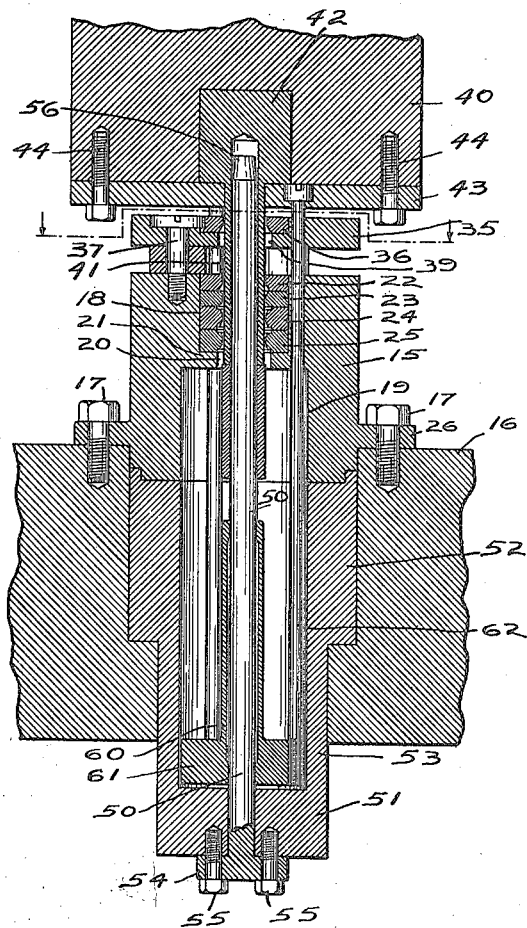

W. H. BUNTING.
BEARING.
APPLICATION FILED FEB. 15, 1915.
1,158,369.
Patented Oct. 26, 1915.
4 SHEETS—SHEET 3.
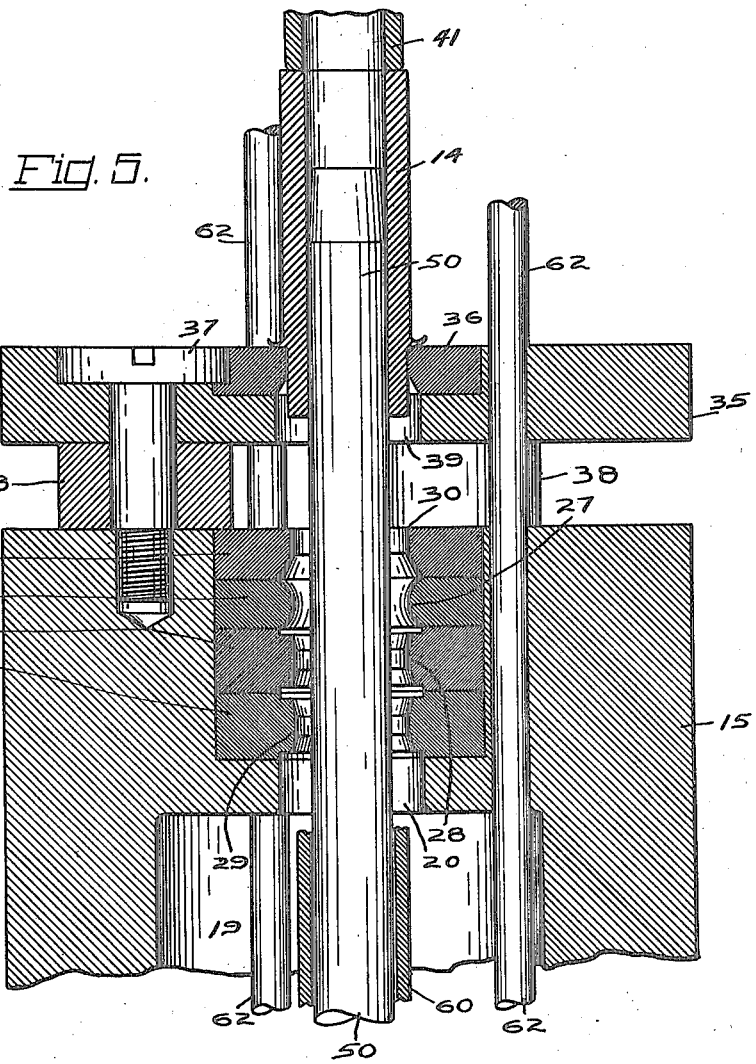
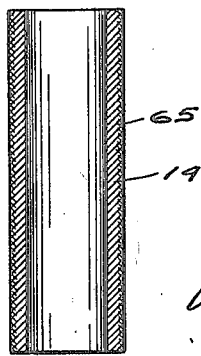
WITNESSES
INVENTOR.
William H. Bunting
by
Owen, Owen & Crampton

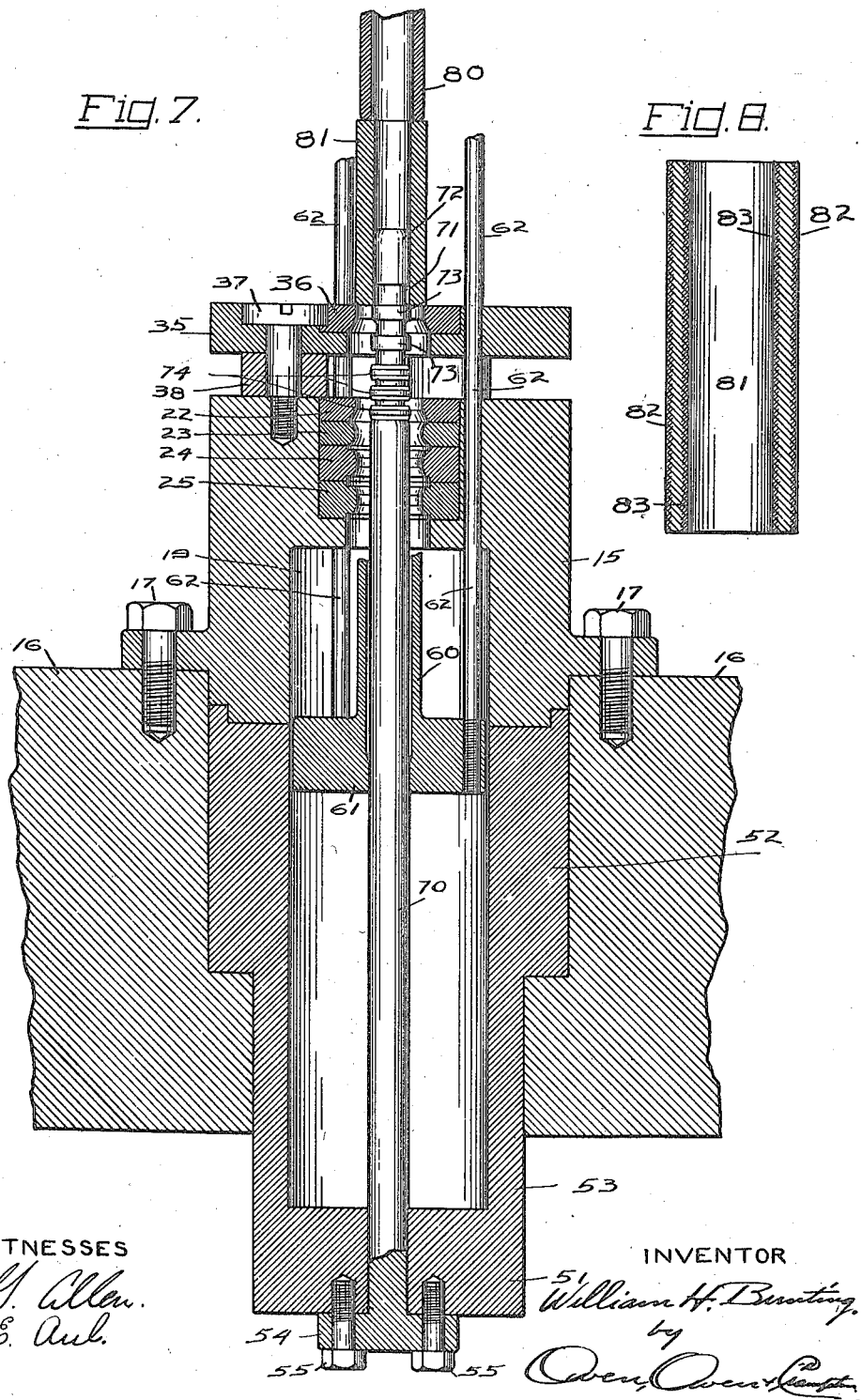

UNITED STATES PATENT OFFICE.

WILLIAM H. BUNTING, OF TOLEDO, OHIO, ASSIGNOR TO BUNTING BRASS & BRONZE COMPANY, OF TOLEDO, OHIO, A CORPORATION OF OHIO.

BEARING.

1,158,369.   Specification of Letters Patent.   Patented Oct. 26, 1915.

Application filed February 15, 1915. Serial No. 8,240.

*To all whom it may concern:*

Be it known that I, WILLIAM H. BUNTING, a citizen of the United States, and a resident of Toledo, in the county of Lucas and State of Ohio, have invented a certain new and useful Bearing; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to bearings and the means for forming the same.

The object of the invention is to produce bearings having exceedingly hard bearing surfaces as well as bearings that are perfect in their cylindrical formation. By my invention bearings may be formed having bearing surfaces in which there are no irregularities due to tooling such as, microscopic corrugations formed by cutting tools and wherein the circular cross-section is perfect in its contour. Also, by my invention the surface of the metal bearing is compressed so as to make a hardened compacted layer having a density which decreases from the bearing surface inward. Also the compressional and tensile strength of the bearing are greatly increased.

The bearings may be formed of any one of a number of metals and alloys of metals. I find it preferable to make the bearings of brass and bronze, for they are sufficiently rigid, that is, have sufficient tensile strength to withstand the compressing action of the tool while compacting their surfaces. They will also retain the compacted surfaces when once formed. However, other metals may be used, provided, the bearing surfaces may be perfected to true cylindrical and regular surfaces or may be compacted to form hardened surfaces.

The bearings containing my invention have their bearing surfaces perfected by a surface compacter.

The apparatus whereby the bearings involving my invention are constructed is also illustrated and described in the drawings and constitutes a part of my invention.

The advantages of a bearing having a true cylindrical and hardened surface is obvious. In the bearings containing my invention the surfaces last three and four times the length of bearing surfaces which do not contain my invention and which are not perfected or hardened like the bearings containing my invention.

The invention may be contained in bearings usable for different purposes and they may be formed by constructions of different forms, all of which come within the purview of my claims hereinafter appended. To show the practicability of the invention, I have selected samples of such bearings and constructions and shall describe them hereinafter. They are illustrated in the accompanying drawings.

Figure 2:
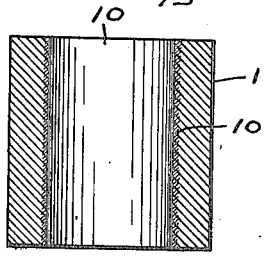

Figure 1 of the drawing illustrates a tool for forming an inside bearing. Fig. 2 illustrates an inner bearing formed by the tool illustrated in Fig. 1. Fig. 3 is a sectional view of a part of a machine for forming an outside bearing. Fig. 4 is a transverse sectional view of the part of the surfacing machine shown in Fig. 3. Fig. 5 is an enlarged view of a portion of the machine shown in Fig. 3. Fig. 6 is a bearing showing in a conventional way the skin produced on the outer surface of the bearing. Fig. 7 shows a sectional view of a part of a machine forming an inside and outside bearing. Fig. 8 illustrates a sectional view of a bearing formed by the machine illustrated in part in Fig. 7.

In the drawing, 1 is the unfinished bushing or bearing.

2 is one form of a surface compacter having a pilot or guiding or centering block 3 and the shaving or scraping flanges or beads or ridges 4 and 5. The flanges 4 and 5 have cutting edges 6. The flange or ridge 4 has a diameter a little larger than the diameter of the pilot 3 which has a fitting size to the bushings. The differences in the diameters of the flanges and the pilots in different size compacters vary according to the diameter of the bearing surface to be formed. A bearing surface having an inner diameter of about one inch is perfected and hardened by a compacter tool wherein the flange 4 is about .012 of an inch larger than the diameter of the pilot 3. The succeeding flange 105 has a diameter of about .005 of an inch larger than the diameter of the preceding flange or ridge.

The tool is also provided with compacting beads 7, 8 and 9, for burnishing and compacting the surfaces of the bearings. They have diameters increasing in size in succession away from the pilot. In a one-inch compacter tool the diameters of adjoining beads differ by about .001 of an inch. The number of flanges and the number of beads may be varied according to the character of the surfaces to be produced, according to the inner diameters of the bearing surfaces and also according to the character of the metal of which the bushing is composed.

In the formation of the bearing, the bearing is placed on the table 11 of a suitable press and the pilot of the compacter tool is placed in the end of the bearing. A plunger 12 then forces the tool through the bearing and through a hole 13 in the table producing thereby a compacted surface which greatly reduces the coefficient of friction.

In Fig. 2 is shown in a somewhat conventional way the hardened bearing surface 10 in a vertical cross-sectional view of a bearing containing my invention.

In Fig. 3 is shown a tool for forming a bearing having a low coefficient friction on its outer surface. A heavy block 15 is bolted to a table 16 by means of the machine bolts 17 which pass through a flange 26. The block 15 is bored from the top and the bottom, forming thereby a recess 18 and a chamber 19. The recess and the chamber 19 are connected with an opening 20 located in the separating wall 21. In the recess 18 are located a plurality of rings 22, 23, 24, and 25 of hardened steel. The inner surfaces of the rings are beaded and so shaped as to operate upon the outer surface of the bearing. The ring 22 is provided with a square edge 30 which will cut the surface of the bearing as it is forced through the ring. The ring 23 is provided with a rounded inner surface which compresses the surface of the bearing, while the rings 24 and 25 are provided with flat surfaces which perfect the surface of the bearing. The inner diameters of the surfacing parts of the rings decrease in succession from the first or top ring to the last or bottom ring so that as the bushing or bearing is forced through the rings each ring compresses more and more, the bushing or bearing and smooths and compacts the surface and reduces the co-efficient friction of the bearing surface to a minimum and increases the compressional strength and tensile strength.

Above the block 15 is supported a plate 35 having a cutting ring 36 embodied in its upper surface. The ring 36 is clamped in position by the heads of the bolts 37 which extend through the plate 35 and spacing blocks 38 and into the surfacing block 15. The plate 35 is provided with an opening 39 which permits the escape of any chips or waste metal that may be shaved from the bearing. The space beneath the plate also permits the escape of chips and to a large extent, prevents the chips from being carried through the rings located in the surfacing block 15.

Above the surfacing block 15 and the plate 35 is located a plunger 40 in which is secured a plunger sleeve 41. The plunger sleeve 41 is provided with a block 42 forming a head for the sleeve 41. The block or head 42 is placed in a recess in the lower end of the plunger 40 and is clamped in position by means of the plate 43 which is bolted to the plunger 40 by means of the machine bolts 44. The plunger 40 is raised sufficiently to withdraw the plunger sleeve 41 from the cutting ring 36 and also to a height sufficient to enable the operator to place the bearing to be surfaced in axial alinement with the surfacing rings above the plate 35. The plunger sleeve 41 operates to drive the bearing through the surfacing rings in the surfacing operation of the bushings.

A centering rod 50 is also located centrally with respect to the surfacing block 15. The centering rod is bolted to a shell 51 which is locked in the table 16 by the clamping of the surfacing block 15 to the table 16. The shell 51 is located in a recess formed in the table, it being provided with an enlarged portion 52 which fits into the recess of the table and a neck 53 which, preferably, extends through to the under side of the table. The rod 50 is provided with a flanged head 54 which is bolted by means of the bolts 55 to the lower end of the shell 51 and centrally with respect thereto. The rod 50 extends up through the shell 51, the surfacing block 15 and the plate 35 and terminates preferably a short distance above the plate 35 and in a chamfered end 56. When the plunger 40 is down, the centering rod 50 also passes up through the plunger sleeve 41. The rod 50 not only centers the sleeve but also forms a supporting body for the hollow bushing, while it is being placed under the compression caused by forcing it through the surfacing rings. The bushings are placed over the end of the rod 50 and the plunger sleeve 41 forces the bushing along the rod and through the surfacing rings. The bushing is also returned through the rings and is again operated upon by the lower surface ring 25 which further perfects the bearing surface by the reverse movement of the bushing. A second plunger sleeve 60 is provided with a head 61 in which are threaded a plurality of rods 62. The rods 62 extend up through the shell 51, through holes in the surfacing block 15 and through the plate 35 to the plunger 40. The rods are connected to the plunger 40 and held in position by means of the plate 43 which clamps the heads of the rods 62 in position and to the plunger 40 in the same way that the plunger sleeve 41 is clamped to the plunger 40. The plunger sleeve 60 also moves along the rod 50 and in advance of the bearing as it is surfaced by the surfacing rings. The plunger sleeve 41 pushes the bearing down and the plunger sleeve 60 pushes the bearing sleeve up and so that the bearing may be removed from the upper end of the rod 50 when the surfacing operation has been completed.

In Fig. 6 is shown the bearing having its outer surface compacted to a substantially perfect bearing surface 65. The bearing may also be operated upon by the compacter 2 to surface the interior of the bearing, if the bushing is to be used for an inside as well as an outside bearing.

I have also provided a means for forming bearings having inner and outer bearing surfaces and which are exceedingly hard and of high compressional and tensile strength and at the same time bearing surfaces which are compacted and perfected to true cylindrical and regular surfaces.

The part of the machine whereby the inside and outside bearings are made in a single operation is shown in Fig. 7. It is provided at its upper end with an inside compacter of the type shown in Fig. 1, and an outside compacter of the type shown in Fig. 5. The guiding rod 70 is provided at its upper end with the inside compacter 71 having the pilot 72, the cutting ridges or beads 73 and the compacting beads 74 which increase in diameter as in the manner described in connection with the compacter shown in Fig. 1. The compacter 71 is so located that its pilot is located above the cutting ring 36 of the outside surfacing means. The diameter of the rod 70 is very nearly as large as the lower bead 74 of the compacter 71 so that the rod 70 will form a supporting body to the bearing as it passes through the surfacing rings 27, 28, 29, and 30.

The plunger 80, is so located as to permit the bearing to be placed above the pilot 72 of the compacter 71. The plunger 80 forces the bearing 81 along the compacter 71 and the rod 70 and through the rings 36, 22, 23, 24 and 25 while the plunger 60 descends. In the return movement of the plunger 60, it forces the bearing 81 upward and through the rings along the rod 70 and the compacter 71 and finally off from the pilot 72.

In Fig. 8 is shown the bearing 81 formed by the device shown in Fig. 7 having the compacted surfaces 82 and 83, the two surfaces being shown in a conventional way to indicate the compacted surfaces of the bearing 81.

The bearings may be greatly varied in their dimensions and the constructions may be greatly altered in the arrangement and manufacture of their parts and in the substitution of elements having equivalent functions.

Having thus described my invention, what I claim as new, and desire to secure by Letters Patent, is,—

1. A bearing having a cylindrical bearing surface, the skin of the surface compacted and supported by a non-compacted integral body portion and formed of a non-ferrous material.

2. A bronze bearing having a cylindrical bearing surface, the skin of the surface being compacted and supported by a non-compacted portion of the bronze bearing.

3. A cast metal bearing having compacted skins forming inner and outer bearing surfaces, and supported by the non-compacted body portion of the cast metal bearing.

In testimony whereof, I have hereunto signed my name to this specification in the presence of two subscribing witnesses.

WILLIAM H. BUNTING.

Witnesses:
  F. E. AUL,
  M. H. MAYERS.